United States Patent
Frishman et al.

(10) Patent No.: US 9,450,976 B1
(45) Date of Patent: Sep. 20, 2016

(54) MANAGING DATA TRAFFIC IN THE PRESENCE OF A SENSITIVE SITE

(71) Applicant: International Business Machines Corporation, Armonk, NY (US)

(72) Inventors: Gal Frishman, Holon (IL); Avner Gideoni, Haoranim (IL); Elad Menahem, Tel-Aviv (IL); Shaked Vax, Daniel (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/011,154

(22) Filed: Jan. 29, 2016

(51) Int. Cl.
*H04L 29/06* (2006.01)

(52) U.S. Cl.
CPC ....... *H04L 63/1416* (2013.01); *H04L 63/1425* (2013.01)

(58) Field of Classification Search
CPC ........... H04L 63/1416; H04L 63/1425; H04L 63/10; H04L 63/029; H04L 63/0272; H04L 63/1441; H04L 63/20; H04L 63/0227; H04L 63/102; H04L 63/0263; H04L 12/585; H04L 63/0428; H04L 63/101; H04L 63/02; H04L 63/04; H04L 63/14; H04L 63/1408
See application file for complete search history.

(56) References Cited

U.S. PATENT DOCUMENTS

| | | | |
|---|---|---|---|
| 8,543,696 B1 | 9/2013 | Williamson | G06F 15/173 |
| 8,918,860 B1* | 12/2014 | Enderwick | H04L 63/0823 726/15 |
| 2003/0018778 A1* | 1/2003 | Martin | G06Q 30/02 709/224 |
| 2006/0037072 A1* | 2/2006 | Rao | H04L 1/1854 726/14 |
| 2006/0174318 A1* | 8/2006 | Shelest | G06F 21/53 726/1 |
| 2007/0192344 A1* | 8/2007 | Meier | G06F 21/554 |
| 2008/0077700 A1* | 3/2008 | Hibino | H04L 41/0226 709/230 |
| 2009/0037976 A1* | 2/2009 | Teo | G06F 21/566 726/1 |
| 2009/0144740 A1 | 6/2009 | Gao | G06F 9/46 |
| 2009/0158420 A1* | 6/2009 | Ks | H04L 12/4641 726/15 |
| 2013/0047256 A1* | 2/2013 | Man | G06F 21/53 726/24 |
| 2014/0198700 A1* | 7/2014 | Kim | H04L 47/56 370/311 |
| 2014/0373161 A1* | 12/2014 | Hudson | H04L 63/1433 726/25 |
| 2015/0123269 A1* | 5/2015 | Chen | H01L 23/562 257/737 |
| 2015/0172921 A1* | 6/2015 | Wang | H04W 12/06 726/3 |
| 2016/0099963 A1* | 4/2016 | Mahaffey | H04L 63/1433 726/25 |

\* cited by examiner

*Primary Examiner* — Darren B Schwartz (57) ABSTRACT

Website security may be managed based on known site attributes and placing limits on communication outside a site. One example may include at least one of identifying a site that is currently operating within a first process, comparing the site to known sensitive sites, and responsive to identifying the site as being a known sensitive site, enabling a data traffic limiting operation to limit data traffic in at least one other process apart from the first process.

20 Claims, 5 Drawing Sheets

MANAGING DATA TRAFFIC IN THE PRESENCE OF A SENSITIVE SITE

TECHNICAL FIELD

This application relates to security management for browser-enabled sites, and more specifically, to reducing the likelihood of information theft via a remote attack by limiting outgoing traffic in the presence of a sensitive site.

BACKGROUND

Remote access/support tools can present threats to online users. For example, banking customers might be defrauded using remote administration tools by permitting remote administrative parties to view and access activities conducted by the users while accessing sensitive sites and utilizing sensitive information (i.e., social security numbers, bank account numbers, etc.). Conventional approaches may simply deny usage of remote tools and/or block protocol-specific communication to reduce the likelihood of such security threats. While such blocking operations may reduce the number of security concerns, drawbacks exist as they block legitimate software assistant tools and require knowledge of the specific tools/protocols used by hackers or scammers.

SUMMARY

One example method of operation may include at least one of identifying at least one site that is currently operating within a first process, comparing the at least one site to known sensitive sites, and responsive to identifying the at least one site as being a known sensitive site, enabling a data traffic limiting operation to limit data traffic in at least one other process apart from the first process.

Another example embodiment may include an apparatus that includes a processor configured to perform at least one of identify at least one site that is currently operating within a first process, compare the at least one site to known sensitive sites, and responsive to the at least one site being identified as being a known sensitive site, enable a data traffic limit operation to limit data traffic in at least one other process apart from the first process.

Another example embodiment may include a non-transitory computer readable storage medium configured to store instructions that when executed causes a processor to perform at least one of identifying at least one site that is currently operating within a first process, comparing the at least one site to known sensitive sites, and responsive to identifying the at least one site as being a known sensitive site, enabling a data traffic limiting operation to limit data traffic in at least one other process apart from the first process.

DETAILED DESCRIPTION

It will be readily understood that the instant components, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments.

The instant features, structures, or characteristics of described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments, the application may be applied to many types of network data, such as, packet, frame, datagram, etc. The term "message" also includes packet, frame, datagram, and any equivalents thereof. Furthermore, while certain types of messages and signaling are depicted in exemplary embodiments they are not limited to a certain type of message, and the application is not limited to a certain type of signaling.

Example embodiments provide procedures to exclude remote access to user devices while the user device is accessing a sensitive web site or other privileged application. In operation, the access and use of a protected site may be identified by a site catalogue, text file, or other third party site source that provides a site status that identifies the site as sensitive and/or as being related to privileged information. Next, a traffic shaping agent initiates a traffic slowing operation that thwarts outgoing and/or incoming traffic not originating from the site itself and/or the browser process enabling the site. The site and/or browser may be identified via a single process or a limited number of processes and that particular process may be elevated and separated from other processes by permitting full bandwidth capabilities while limiting or stopping all bandwidth capabilities of all other processes during the operation of the site and the corresponding privileged access operations. Also, a 'whitelist' of applications may be part of an exclusion list which should not be affected by the traffic management operations, however, in general the browser related process is the application which is maintained at a full-capacity or a non-slowed rate while the other applications or network requiring processes/functions are slowed or even stopped from sending and/or receiving data across a network connected to the computing device.

The open browser sites may be compared to a set of predefined sensitive sites (URLs), and responsive to determining a browser session has been established to a predefined site of an elevated nature and/or a privileged level of communication, an action may be enabled by a site agent to slow down or eliminate outgoing traffic not originating from the site/browser associated with the elevated level of security. The actions may include notifying a network component or network profile of the traffic enabling action. The notification may be received from the browser and the browser process may be identified to slow outgoing traffic from any process different from the browser process.

Figure 1:
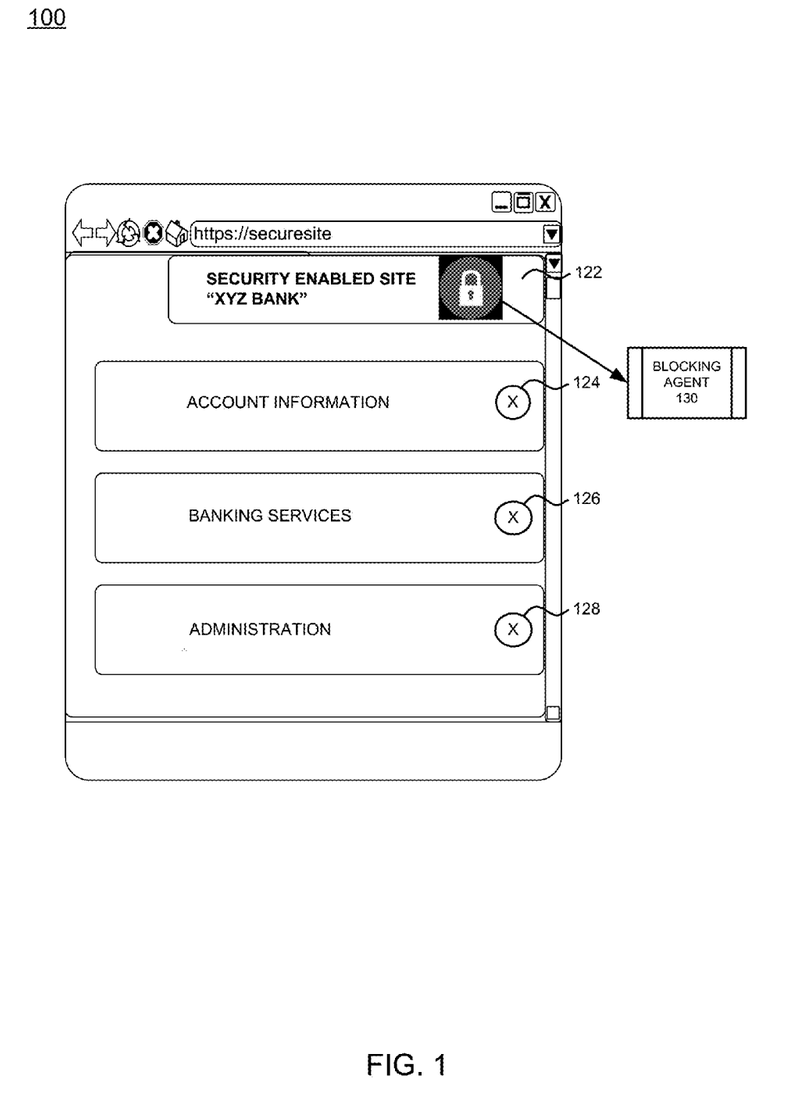
FIG. 1 illustrates a user interface of a sensitive or secure site access operation according to an example embodiment.

FIG. 1 illustrates a user interface 100 of a sensitive or secure site access operation according to an example embodiment. Referring to FIG. 1, a user device, which includes a processor and memory (not shown) may display an interface 100, such as a website interface, with a link to a secure or sensitive site (i.e., XYZ bank). In this example, the site may be a banking site that requires a login and other sensitive credentials a user may not be willing to share with others and which should be kept hidden from outside parties. The site may be a sensitive site with encryption and other added security measures. The initiation of the site may enable a security measure 122 to initiate a blocking agent 130 as a plug-in agent application managed by at least one separate security application installed on the user device and/or via a remote server (not shown). The site may have regular accessibility options, such as, for example only, "account information" 124, "banking services" 126, and "administration" services 128 all of which are permitted by the blocking agent 130. However, other services, applets, processes, threads, instructions, software, etc., operating on the user device may be blocked by the blocking agent from sending and receiving data remotely while the sensitive site is being accessed and operated. For example, while browsing content of the sensitive web site (e.g. online banking), the blocking agent 130 may initiate a slow-down/stop of all outgoing data which is not specific to the browser 100. This may include add-ons and plug-ins attempting to install through the browser and which may lead to an undesired third party seeking access to the sensitive content of the sensitive site.

Figure 2:
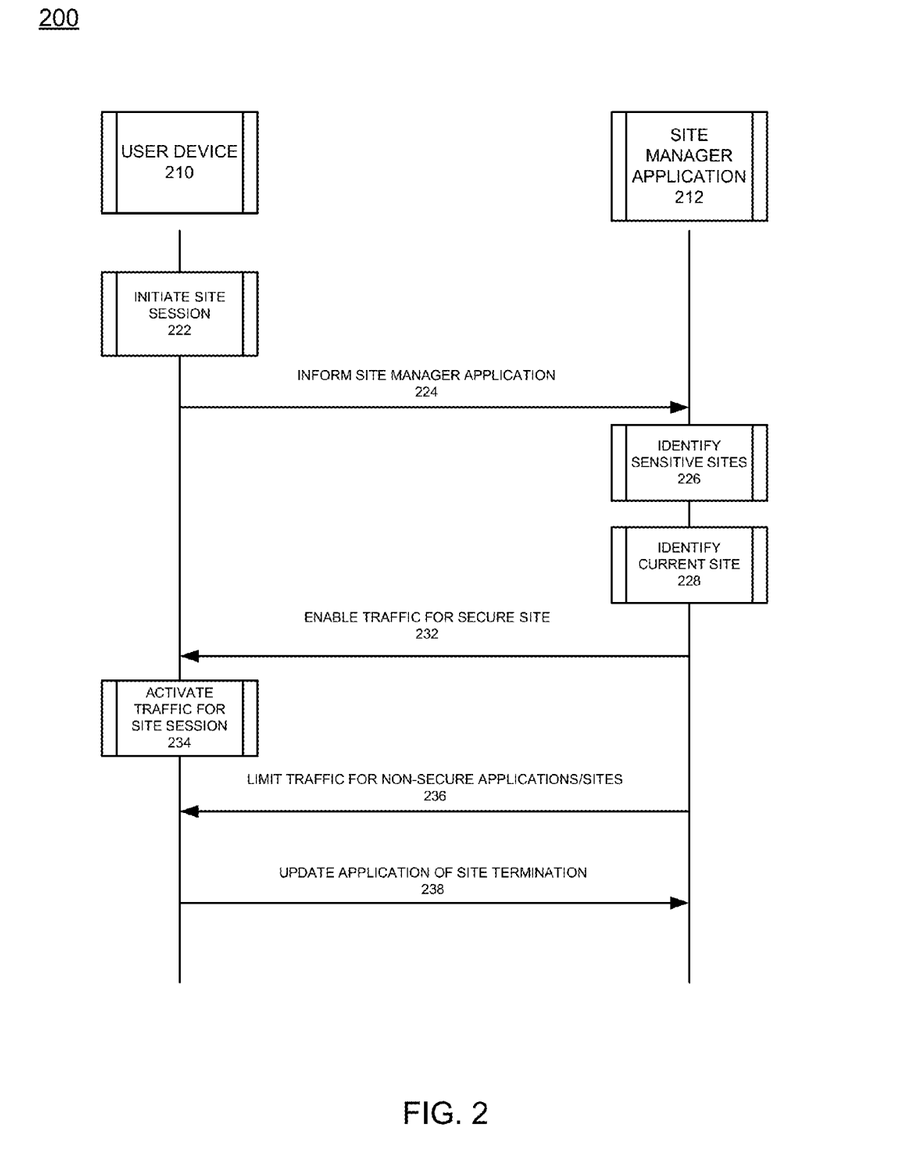
FIG. 2 illustrates a system communication diagram of a data communication session between a user device and a site manager application according to an example embodiment.

FIG. 2 illustrates a system communication diagram 200 of a data communication session between a user device 210 and a site manager application 212 according to an example embodiment of the present application. Referring to FIG. 2, in order to limit the likelihood of remote sessions, which could divulge sensitive data, slow a network, create a delay and limit outgoing bandwidth, the site must be identified as sensitive and traffic management must be performed to reduce the chances of any attacks. The diagram 200 includes a user device 210 which may be any of a computer, laptop, mobile, wireless or cellular phone, a PDA, a tablet, a client a server or any device that contains a processor and/or memory, whether that processor or memory performs a function related to an embodiment of the disclosure. The user device 200 may communicate with a remote server or device or simply an application 212 which is locally installed on the user device 210. In operation, a session is initiated 222 and the site manager is informed 224 of the activities of the user device 210. Sensitive sites identified from a list or group of known sensitive sites and/or sites that are known to contain sensitive information may be identified 226 and compared to the current site being accessed 228. Site security may be identified and as a result, traffic 232 may be enabled for that sensitive site. A site browser may be notified of the traffic enablement 234 so traffic can be sent and received via the browser and the current site process. Also, a disable message may be received at the user device 210 so traffic is not permitted 236 via other processes while the sensitive site is enabled or such traffic is severely limited to reduce the active bit rate for bits sent and bits received. Once the site use has ceased, the user device may update 238 the site manager application to re-enable the other applications and related forms of data traffic.

One way to identify a certain sensitive site may include a browser plug-in/helper object to audit the sites as they are accessed and whether they are sensitive sites or not sensitive sites, and whether the traffic throttling should be performed to limit other applications/processes while that particular site is being accessed. Also, the browser address window can also be monitored to identify sites by name and then any necessary traffic management functions may be invoked based on that identification operation. When associating network sessions with processes, the applications can be tracked and observed to identify which applications attempted to open certain network sessions/sockets. This enables the traffic limiting operations to begin limiting traffic when certain applications can be identified as having attempted to open a traffic route and are not authorized to do so at that time since the sensitive site is currently active.

In another example, the bandwidth capabilities of other applications may be maintained during a sensitive site session, however, the quality and speed may be degraded to the level where remote controlling may not be performed due to delay/disruption in data, such as video or pictures. This is based on an assumption that all remote administrative tools transmit user's screen images and videos, which consume large amounts of outgoing bandwidth even when compressed. As a result, such a remote controlling tool would not function and a user device may be protected from any such attack utilizing such an application since the application will not function properly.

Figure 3:
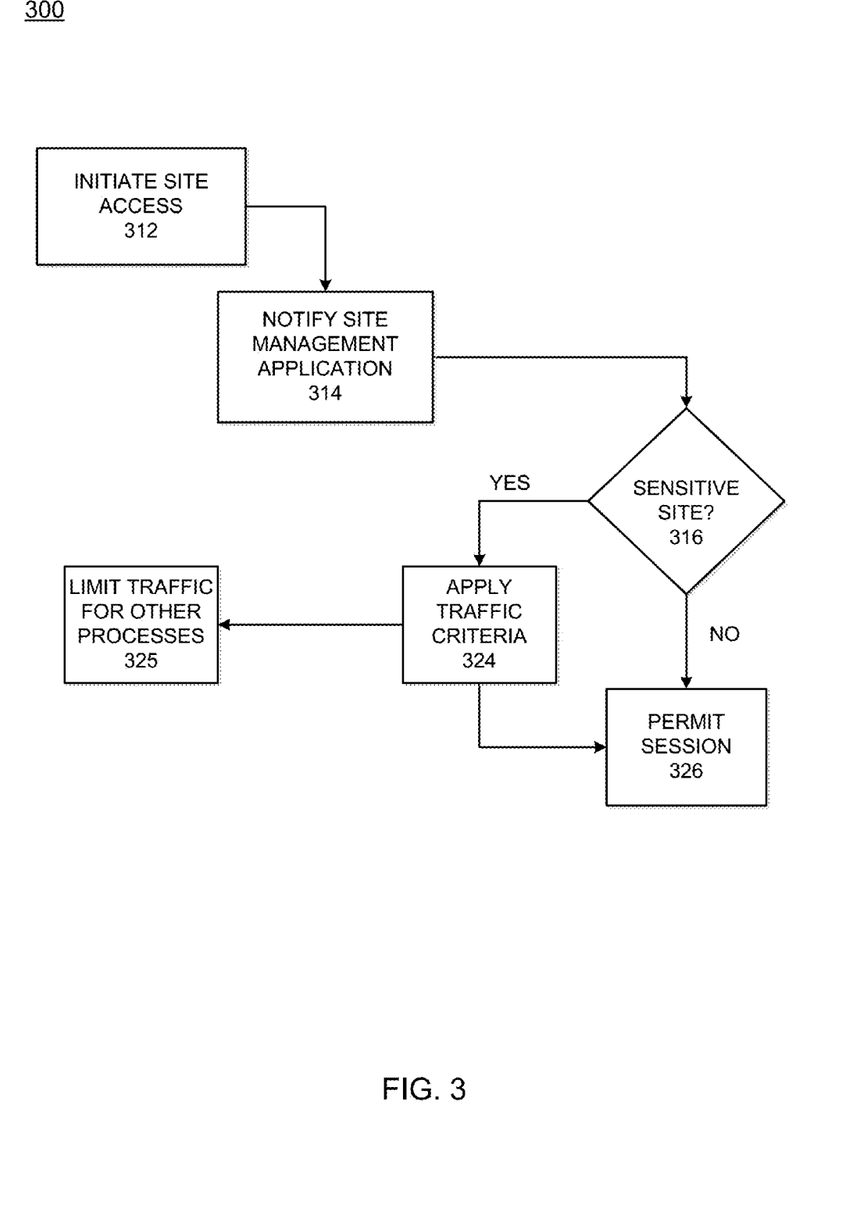
FIG. 3 illustrates a logic flow diagram of a security procedure within a site access configuration according to an example embodiment.

FIG. 3 illustrates a logic flow diagram 300 of a security procedure. This security procedure can operate within a site access configuration according to an example embodiment. Referring to FIG. 3, the logic diagram 300 includes an initial access operation 312 performed by a user device which causes the site management application to be notified 314 and which enacts a bandwidth management function depending on whether the site is sensitive or not 316. If the site is not identified as a sensitive site, then the session is permitted 326 with no modification to the communications of the user device. If the site is a sensitive site, then the traffic criteria 324 may be applied to reduce bandwidth or transmit and receive speeds 325 of applications outside the browser sensitive site. A site may be designated as sensitive when there are various security measures associated with the site and/or via the nature of the site (i.e., financial, personal, email, corporate).

Figure 4:
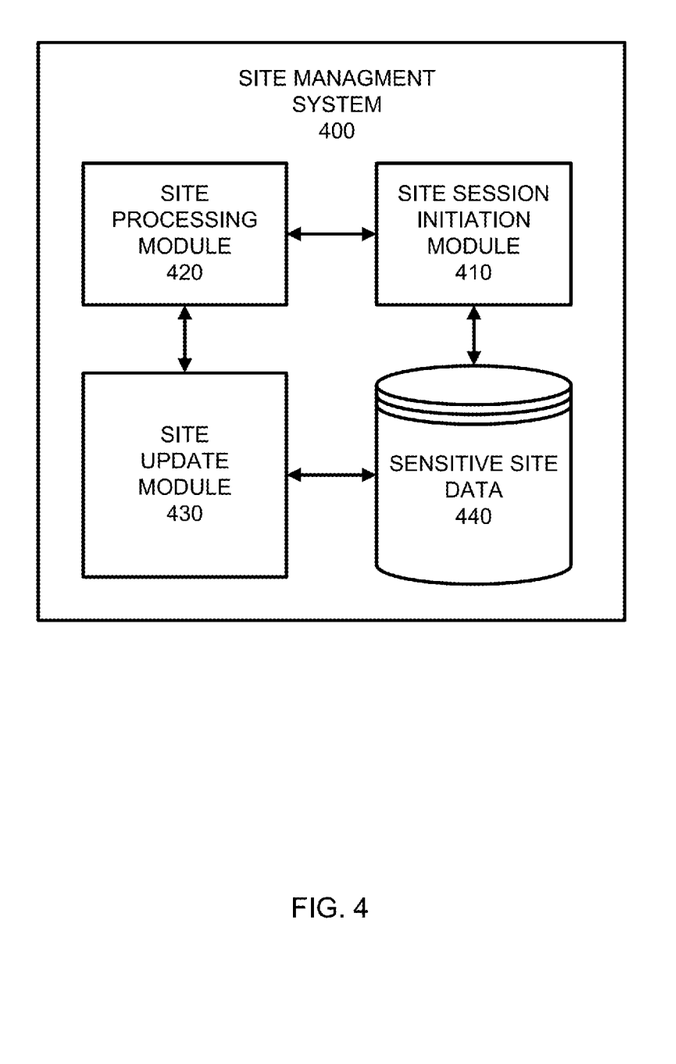
FIG. 4 illustrates a system configuration configured to perform one or more of the example embodiments.

FIG. 4 illustrates a system configuration that may be used to perform one or more of the example methods of operation. Referring to FIG. 4, a site management system 400 may be a single server, device or multiple devices which support the operation of the security measures of the virtual environment. The system 400 includes a site session initiation module 410 which receives a user device action, such as a site request. The site session processing module 420 may receive the request and prepare a response that includes an agent module being sent to the user device for installation. The site session processing module 420 may also identify the site for security ratings or other indicators of site sensitivity. The site update module 430 may ensure the bandwidth of other applications outside the browser are minimized accordingly based on sites which are sensitive and identified from the site sensitive databank 440.

According to one example method of operation performed by the system 400, the site session initiation module 410 may identify at least one site that is currently operating within a first process, such a browser or other site process. The site processing module 420 may perform comparing the site to known sensitive sites utilizing sensitive information via a site list or other site recognizing scheme. Site data may be stored in a site databank 440. Responsive to identifying the site as being a known sensitive site, a data traffic limiting operation is enabled to limit data traffic in at least one other process apart from the site operating in the first process. Also, the processing module 420 may perform identifying a site session initiation request from a user device to access the site, and the corresponding site information is then extracted and forwarded from the site to a site manager application.

One example of a traffic limiting operation may include reducing bandwidth of traffic for processes operating outside the web browser, any changes can be performed via the site update module 430. The reducing of bandwidth of the traffic may include blocking traffic for processes operating outside the web browser or simply limiting their bandwidth to a certain level that cannot be exceeded. One way to identify a process that is attempting to utilize bandwidth and access a network may include receiving a notification that at least one of the processes operating outside the web browser attempted to open a socket. Once the secure site is recognized, this attempt to open a socket may be thwarted completely or the attempt may have a severe bandwidth limitation imposed as a result of the sensitive site status. The process may also include identifying at least one process operating outside the web browser which attempted to open the socket, and limiting bandwidth capabilities of the identified process while permitting the process to utilize the network but not at full capacity.

The operations of a method or steps described in connection with the embodiments disclosed herein may be embodied directly in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components, etc.

Figure 5:
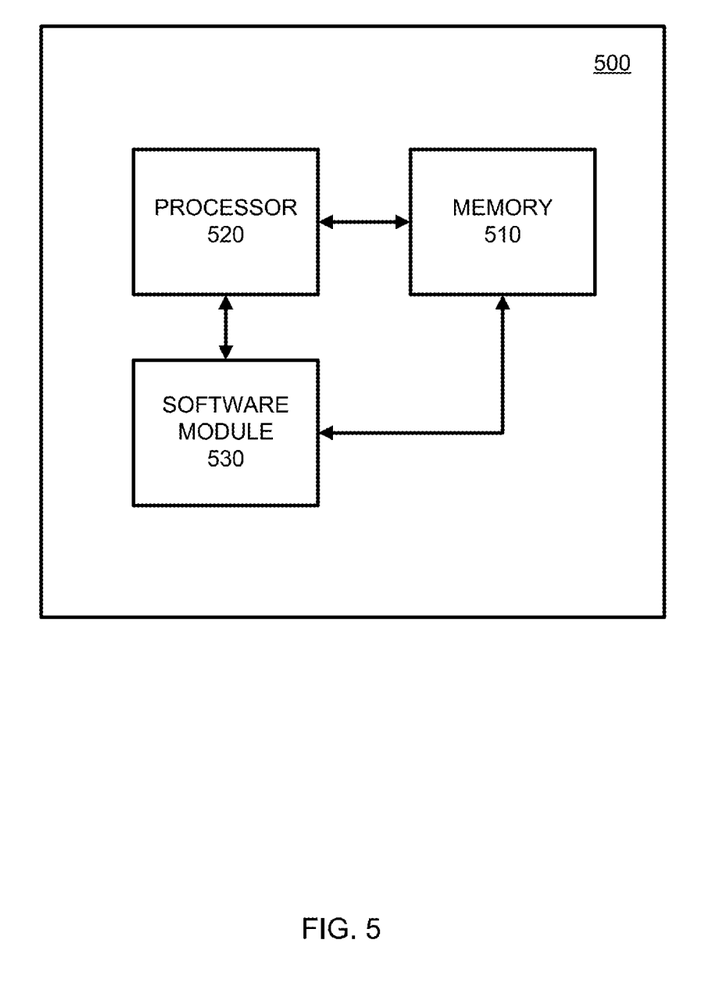
FIG. 5 illustrates an example network entity device configured to store instructions to perform one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    initiating a first process and at least one other process on a computer;
    identifying, by the computer, at least one site that is currently operating within the first process;
    comparing, by the computer, the at least one site to known sensitive sites; and
    responsive to identifying the at least one site as being a known sensitive site, slowing, by the computer, bandwidth of traffic in the at least one other process apart from the first process.

2. The method of claim 1, further comprising at least one of:
    identifying a site session initiation request from a user device to access the at least one site; and
    forwarding site information extracted from the at least one site to a site manager application.

3. The method of claim 1, wherein the first process is a web browser.

4. The method of claim 1, wherein the slowing the bandwidth of traffic occurs for processes operating outside the web browser.

5. The method of claim 4, wherein the slowing the bandwidth of traffic comprises blocking traffic for processes operating outside the web browser.

6. The method of claim 1, further comprising receiving a notification that at least one of the processes operating outside the web browser attempted to open a socket.

7. The method of claim 6, further comprising at least one of:
    identifying the at least one process operating outside the web browser which attempted to open the socket; and
    limiting bandwidth capabilities of the identified at least one process.

8. An apparatus, comprising:
    a processor configured to:
        initiate a first process and at least one other process;
        identify at least one site that operates within the first process;
        compare the at least one site to known sensitive sites; and
        responsive to the at least one site being identified as being a known sensitive site, slow bandwidth of traffic in the at least one other process apart from the first process.

9. The apparatus of claim 8, wherein the processor is further configured to perform at least one of:
    identify a site session initiation request from a user device to access the at least one site, and
    forward site information extracted from the at least one site to a site manager application.

10. The apparatus of claim 8, wherein the first process is a web browser.

11. The apparatus of claim 8, wherein the slowing the bandwidth of traffic occurs for processes outside the web browser.

12. The apparatus of claim 11, wherein the slowing the bandwidth of traffic occurs for processes operating outside the web browser.

13. The apparatus of claim 8, further comprising a receiver configured to receive a notification that at least one of the processes operating outside the web browser attempted to open a socket.

14. The apparatus of claim 13, wherein the processor is further configured to perform at least one of:
    identify the at least one process operating outside the web browser which attempted to open the socket, and
    limit bandwidth capabilities of the identified at least one process.

15. A non-transitory computer readable storage medium configured to store instructions that when executed causes a processor to perform:
    initiating a first process and at least one other process;
    identifying at least one site that is currently operating within the first process;
    comparing the at least one site to known sensitive sites; and
    responsive to identifying the at least one site as being a known sensitive site, slowing, by the computer, bandwidth of traffic in the at least one other process apart from the first process.

16. The non-transitory computer readable storage medium of claim 15, wherein the processor is further configured to perform at least one of:
    identifying a site session initiation request from a user device to access the at least one site; and
    forwarding site information extracted from the at least one site to a site manager application.

17. The non-transitory computer readable storage medium of claim 15, wherein the first process is a web browser.

18. The non-transitory computer readable storage medium of claim 15, wherein the slowing the bandwidth of traffic occurs for processes operating outside the web browser.

19. The non-transitory computer readable storage medium of claim 18, wherein the slowing the bandwidth of traffic comprises blocking traffic for processes operating outside the web browser.

20. The non-transitory computer readable storage medium of claim 15, wherein the processor is further configured to perform at least one of:

receiving a notification that at least one of the processes operating outside the web browser attempted to open a socket;
identifying the at least one process operating outside the web browser which attempted to open the socket; and
limiting bandwidth capabilities of the identified at least one process.

* * * * *